June 13, 1961 C. LUDWIG 2,988,201
BULK MATERIAL TRIMMER FOR BOAT LOADING APPARATUS
Filed July 27, 1959 4 Sheets-Sheet 1
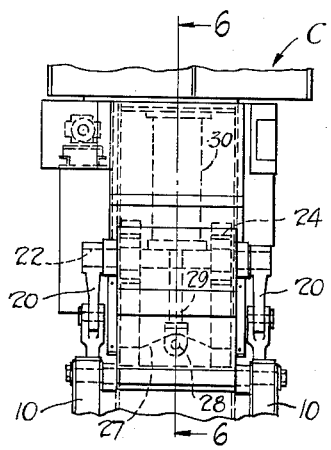
Fig. 2
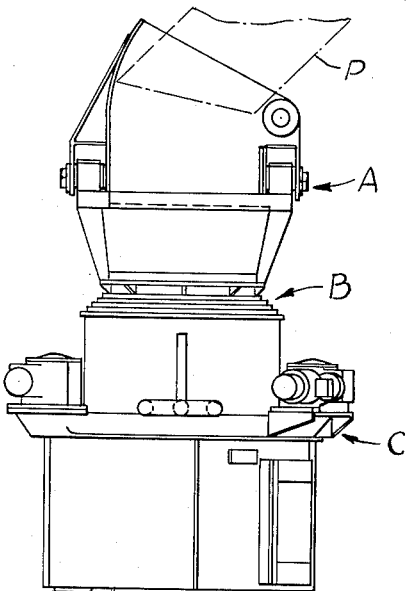
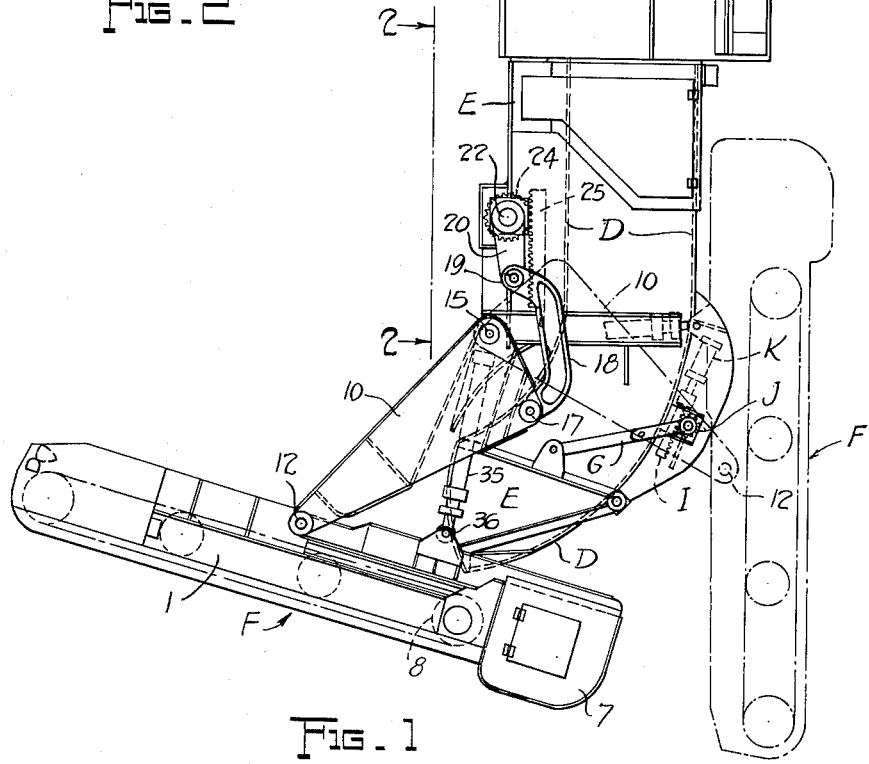
Fig. 1
INVENTOR.
CARL LUDWIG
BY
Justin C. Macklin
ATTY June 13, 1961

C. LUDWIG 2,988,201

BULK MATERIAL TRIMMER FOR BOAT LOADING APPARATUS

Filed July 27, 1959

INVENTOR.
CARL LUDWIG
BY

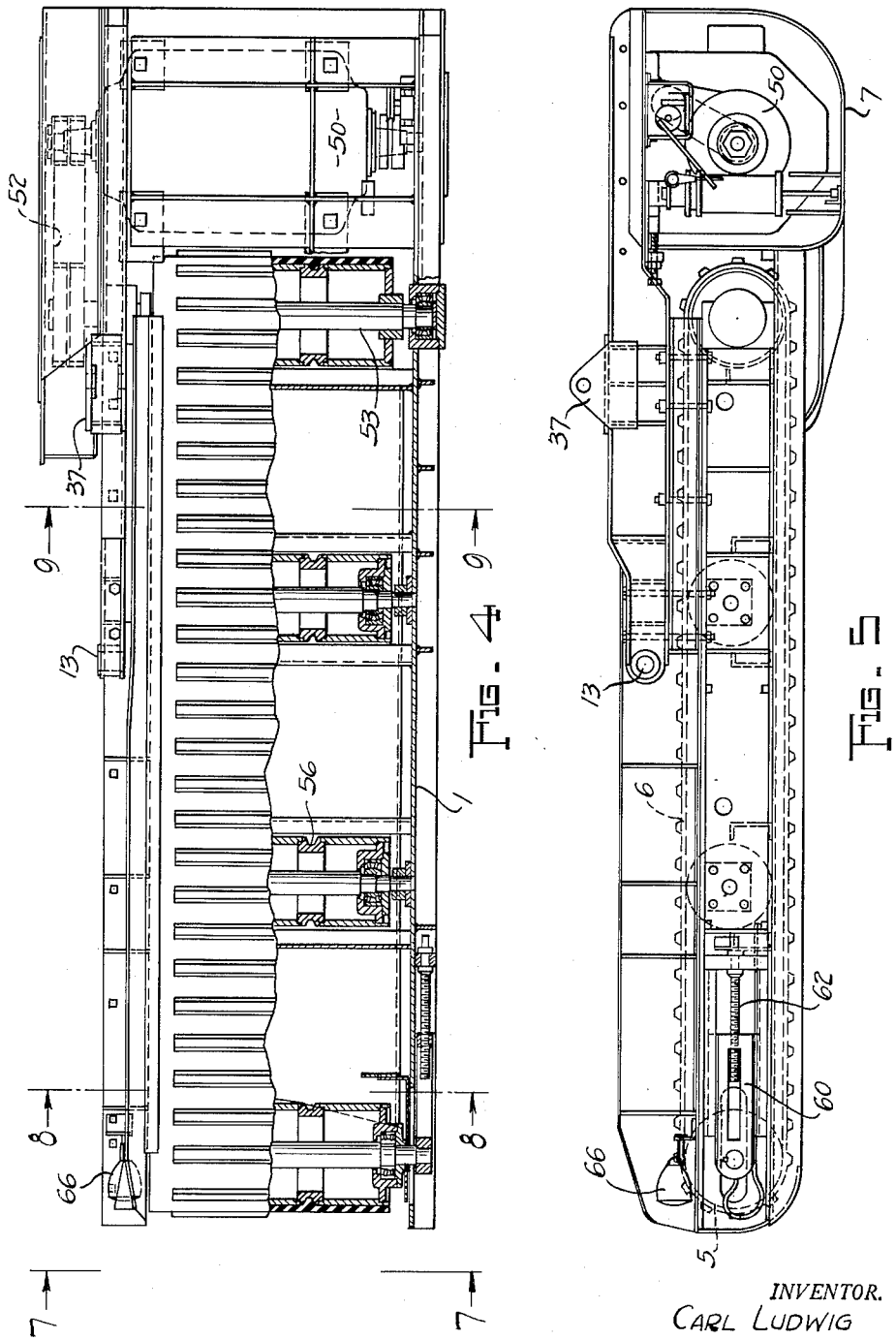

June 13, 1961 C. LUDWIG 2,988,201
BULK MATERIAL TRIMMER FOR BOAT LOADING APPARATUS
Filed July 27, 1959 4 Sheets-Sheet 4

INVENTOR.
CARL LUDWIG
BY
ATTY

United States Patent Office 2,988,201
Patented June 13, 1961

2,988,201
BULK MATERIAL TRIMMER FOR BOAT
LOADING APPARATUS
Carl Ludwig, Cleveland, Ohio, assignor to The Wellman Engineering Company, Cleveland, Ohio, a corporation of Ohio
Filed July 27, 1959, Ser. No. 829,839
8 Claims. (Cl. 198—128)

This invention relates to trimmers adapted to be rotatably carried at the lower end of a delivery chute for distributing bulk material such as coal in the holds of ships.

Essential objects include so constructing such a trimmer that it shall be relatively simple, efficient, durable, and capable of rapidly handling large quantities of loose material.

More particularly, the general objects of the present invention are to provide such a large capacity trimmer which will handle loose material, such as coal, with a minimum of impact or throwing action, whereby, when it is used, as is intended for its primary purpose in the loading of a vessel with coal, for example, degradation of the coal or the breaking up of its lumps and particles is avoided to a large degree, as compared to that resulting from the much more rapid and forcible throwing action of trimmers of types heretofore widely used.

Such a trimmer comprises an elbow structure arranged for rotatable attachment to the lower end of a large telescoping chute, adapted to extend many feet downwardly into the hold of a vessel, and which has a transverse power driven conveyor belt adapted to be extended laterally from the elbow. With such an arrangement, obviously to avoid forcibly throwing the coal or other loose material cargo and to accomplish the trimming distribution thereof, it is desirable to extend a lateral conveyor unit of the trimmer a substantially greater distance from the vertical telescoping chute than the corresponding lateral reach of shorter, higher speed trimmers heretofore used.

Accordingly, an important object of the present invention is to so movably support the long conveyor portion of the trimmer that it may be extended a greatly increased distance from the vertical chute and elbow, and may also be capable of being retracted to extend only a short distance from the trimmer.

Another object accomplished by the present invention is that in any of its cargo handling positions of the trimmer conveyor, whether fully extended or withdrawn to a position where its delivery end is close to the elbow, it may be tilted either on an upward or downward delivery slope at a substantial angle with relation to the horizontal.

Still another important object is to so arrange this movable mounting for the conveyor portion that the trimmer may be shifted from its delivering position to a substantially vertical position closely adjacent to the rear of the elbow and parallel with the vertical telescoping chute.

As is set forth in a prior patent to Martin Preston, filed August 6, 1956, issued October 21, 1958, No. 2,857,041, an important objective of such a trimmer construction is to so movably support such a longer conveyor portion of the trimmer that when it is retracted to inoperative position, it may present a substantially reduced transverse dimension extending from the vertical feeding chute "for the purpose of entering and withdrawing the trimmer from hatch openings."

As was also mentioned in that patent, trimmers of this general nature had been equipped with motors for driving the belt of the relatively short laterally extending conveyor at sufficiently high speeds to throw the material many feet from the delivery or outer end of the conveyor in order to reach the more remote positions in the hold of the ship. With such shorter delivery belts, the throwing distances required were such that it had been found that the needed rapid propelling and throwing of the material entailed serious disadvantages.

Among the disadvantages are, not only the breaking up or degradation of the coal, which is understood to be very undesirable and to be avoided insofar as practicable, but excessive wear on the conveyor belt and the difficulties of so engaging the material as to effectively move the large volume desired at the high belt speeds required.

It is recognized that in the handling of the coal from the hopper at the upper portion of the ship-loading apparatus downwardly through a transverse or sloping chute into the vertical telescoping chute and thence onto the lateral trimmer-conveyor, the operation is carried out as far as possible without permitting the coal to drop or fall freely for any considerable distance. In this connection, it is desired that movement of the coal from the vertical chute onto the trimmer belt should likewise be in a continuous large volume without any abrupt movement or severe impact.

A problem presented is that of controlling this slower movement of a solid flowing stream of coal, while avoiding dropping and breaking, and while conveying the desired volume, in a given time, to the long trimmer belt and along it to the desired positions in the hold of the ship. Accordingly, another object of the present invention is to provide the trimmer mounting and the conveyor chute leading thereto of such construction that the flow may be so governed as to be free, rapid, and continuous.

More specific objects include so mounting the lateral conveyor trimmer, with a novel arrangement of simple linkage, that the desired movements may be obtained in an effective manner and by the use of operating means such as hydraulic cylinders.

Another specific advantage of the present arrangement is that the long transverse conveyor may be provided with a belt having a flat or straight long horizontal reach and which in all of its positions receives the coal directed thereto through a curved path from the telescoping chute as it is deposited onto the conveyor belt, thus offering minimum resistance and avoiding impact—saving wear on the belt.

The conveyor mechanism itself involves the novel features of a special form of belt having internal longitudinal guiding ribs engaging complementary grooves in the rollers over which the belt passes, while the belt is so formed as to have suitable highly resistant and durable transverse ribs for engaging the coal or other bulk material. Means for effective driving of the belt may be arranged in the unitary structure of the trimmer conveyor.

Other objects and advantages of the present trimmer will become apparent in the following description which relates to the accompanying drawings, in which:

FIG. 1 is a side elevation of the present improved trimmer, showing its association with the supporting telescope and illustrating the operating linkage support and actuating means;

FIG. 2 is a fragmentary elevation of the portion of the trimmer mounting, and showing in broken lines the means for swinging the principal conveyor supporting links, the location of the portion shown in this view being indicated by the lines 2—2 of FIG. 1;

FIG. 4 is a plan view of the trimmer conveyor and belt on an enlarged scale, and shown partly in section;

FIG. 5 is a side elevation of the trimmer conveyor and driving means therefor;

Figure 8:
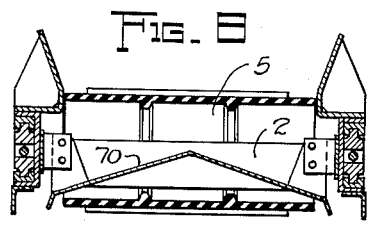
Figure 9:
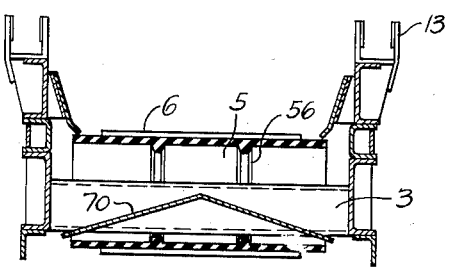
Figure 10:
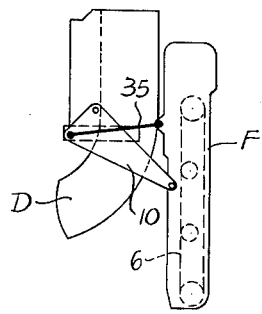

FIGS. 8 and 9 are sections taken on the planes indicated by the lines 8—8 and 9—9 of FIG. 4;

FIG. 10 is a diagrammatic view on a reduced scale, showing the positions of a rigid link and a hydraulic cylinder contractible link, and showing the trimmer in its vertical position closely adjacent to the upright part of the telescope discharge elbow;

FIGS. 11 to 15, inclusive, are similar reduced scale diagrammatic views illustrating various positions in which it is possible to position the links with relation to the discharge elbow.

Referring to the drawings by the use of reference characters, A indicates generally the supporting structure at the upper end of a telescope chute assemblage into which coal is discharged from a sloping chute or "pan," indicated in broken lines at P. B shows the outer lowermost of a series of cylindrical telescope sections on which is mounted a supporting and rotating mechanism, indicated generally at C. D indicates a hollow elbow chute construction having a vertical and a curving portion for receiving material, such as coal, from the telescoping sections and discharging the same, somewhat tangentially, onto the belt of the trimmer conveyor, indicated generally at F. Suitable motor and gearing means effect the usual rotation of the supporting structure for the elbow and the trimmer F.

Essentially the foregoing parts A, B, and C are illustrative of well known similar parts in such a telescope chute assemblage equipped with a rotating trimmer.

The elbow D, as shown, is also the usual construction, preferably having a curved lower end and rear wall with flat sides and an open front constituting the discharge opening toward the trimmer conveyor, and a gate indicated at E has pivoted side plates and an arcuate closure plate adapted to close this elbow discharge opening or be moved upwardly, leaving it fully open.

Any of various operating means may be used for opening and closing such a gate. The means here illustrated constitutes a pair of jointed links G each pivotally connected to the plates E at one end, while its other end is rigid on a shaft having an operating rack and pinion I and J. The rack is longitudinally movable to raise the intermediate portion of the link G, and thus lift the gate, by a hydraulic cylinder indicated in broken lines at K.

The trimmer conveyor frame, as shown, comprises rigid side members generally indicated at 1, and cross members 2 and 3 (FIGS. 8 and 9), with associated structural elements forming a hollow rigid frame within which are mounted guiding pulleys or drums 5 carrying the trimmer conveyor belt 6. At the rear portion of the frame is a suitable housing indicated at 7 for a motor and driving connection to the rearmost pulley or drum, in turn driving the belt for moving the material discharged onto the upper reach thereof.

The trimmer conveyor structure comprising the rigid housing, belt, motor and driving mechanism is so supported that it may be moved to extend it forwardly from or be retracted toward the discharge opening of the elbow D, and it may have its angle, with relation to the horizontal, changed to slope upwardly or downwardly from the elbow in any of its longitudinally extended or retracted positions. By the same supporting means, it may be fully retracted and swung upwardly to the position shown in broken lines in FIG. 1. This position is also shown diagrammatically in FIG. 10.

The trimmer conveyor frame with its mounting and operating mechanism is supported intermediately on what may be termed, for convenience of description, the main pivoted supporting links, each of which is formed of a hollow rigid narrow triangular, indicated generally at 10. At each side of the frame are mountings for the pivots 12, as indicated at 13 in FIGS. 4 and 5. The upper forward corner of the narrow triangular link members 10 are similarly pivoted at 15 to the lower portion of the frame structure and housing E. The rearward corner of each triangular link is provided with a pivot 17 receiving the end of a U-shaped link arm 18 having its other end pivoted at 19 to a crank arm 20.

Figure 6:
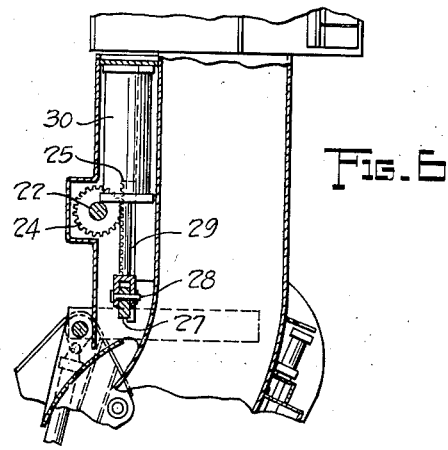
FIG. 6 is a vertical medial section through the upper portion of a discharge elbow at the lower end of the telescope, and showing the cylinder and rack and pinion arrangement for operating the main supporting links; the plane of FIG. 6 is indicated by the line 6—6 of FIG. 2.

As appears in FIG. 2, the crank arms 20 are mounted on a shaft 22, shown in broken lines in FIG. 2, and suitably journaled in a housing rigid with the elbow D. A pair of gears 24, rigid on the shaft 22, may be rotated by meshing toothed racks 25, each connected at the end of a transverse yoke 27, and which is intermediately connected by a pin 28 to the piston rod 29 of a hydraulic cylinder 30 (FIGS. 2 and 6).

As the hydraulic cylinder 30 and its piston rod are operated, the toothed racks 25 will rotate the gears 24, shaft 22, and swing the arms 20, which, in turn, through the link 18 will swing the triangular supporting links 10 about the axis 15. These arms 20 are so shaped and proportioned that maximum movement of links 10 will permit them to be swung in an arc from the solid line position to the position shown in broken lines in FIG. 1.

Additionally supporting the trimmer conveyor and functioning to effect various angular adjusted position with relation to the main triangular supports are a pair of slender, rather long stroke hydraulic cylinders 35, each pivoted at 36 to the side frame portions of the conveyor. Suitable ears for these pivots 36 are indicated at 37 in FIGS. 4 and 5.

The upper end of each hydraulic cylinder is pivoted at or near the pivots 15. In practice I prefer to arrange a pivot, not shown, a short distance below the pivot 15, but it is desirable that in all positions the axial alignment of the hydraulic cylinder link members 35 will be in substantial alignment with the pivots 15.

The frame structure of the triangular support links 10 being made hollow permits the hydraulic link members 35 to be partially housed therein, and also permits convenient connections, not shown, for the hydraulic pressure and exhaust lines for operating these hydraulic cylinder links.

It will be noted that the pivots 12 of the main triangular supporting links 10 are positioned midway of the length of the conveyor frame, preferably slightly forward of the middle, as shown, while the pivots 36 for the hydraulic cylinder supporting and actuating links 35 are positioned a substantial distance toward the rear of the frame 1. In actual practice this distance may be about four feet on a trimmer of a size and capacity to deliver, for example, two thousand tons of coal per hour. That is to say, such a trimmer frame may be on the order of sixteen or seventeen feet or more in overall length.

The stroke of the piston and piston rod of the hydraulic cylinder link 35 may likewise be three and one-half feet or more in such an arrangement.

The long stroke of which the hydraulic cylinder links are capable permits retracting the delivery end of the trimmer conveyor, correspondingly extending the rear portion of the trimmer frame behind the elbow. In the latter position the trimmer frame may be sloped upwardly using the full length stroke of the hydraulic cylinder links, as appears in FIG. 13.

Further illustrating the operation and capabilities of the supporting and adjusting links and operating mechanism described, reference is made to the diagrammatic FIGS. 10 to 15, inclusive. In the position shown in FIG. 10 (and in broken lines in FIG. 1), the trimmer conveyor frame stands in a substantially vertical position in close juxtaposition to the back side of the delivery elbow B. In this position, the transverse dimension across the trimmer supported on the telescope and its rotatable elbow is at a minimum, and thus is capable of entering relatively small hatch openings in the deck of a ship.

Figure 11:
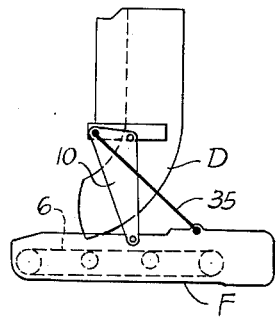

In the course of trimming that ship, that is, in distributing the load, it is desirable to maintain the ship on an even keel during the loading operation, and, as is well known, it is very important to have the complete load in the hold evenly distributed before and during sailing of the vessel. For this purpose it is sometimes desired to first deposit a pile of material directly from the chute and somewhat below the hatch in the hold, and such loading may commence with the trimmer conveyor frame in its vertical idle position. Rotation of the elbow permits a distribution for short distances entirely around the vertical axis of the telescope chute. To enlarge this pile without undue throwing of the coal, it may be desired to operate the trimmer conveyor while it is extended only a short distance from the discharge opening of the elbow, as indicated in FIG. 11. In such a position the trimmer conveyor is operating, while only the outer portion of the conveyor belt would be acting to extend the distance of movement of the material a limited amount more than the throw from the elbow itself.

Figure 12:
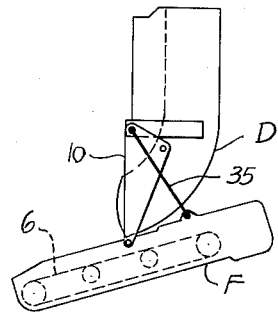
Figure 13:
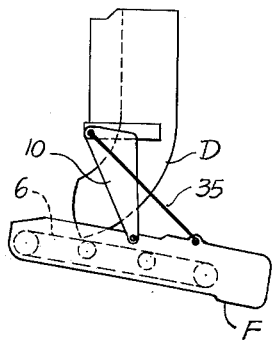
Figure 14:
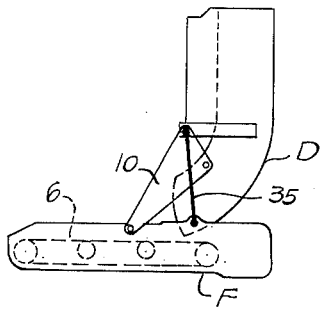
Figure 15:
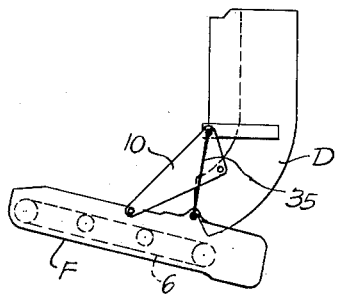

Increasing the material delivery distance while still minimizing the throwing action and limiting the distance of throwing it may be accomplished, for example, by positioning the trimmer, as shown in FIG. 12. Other throwing and conveying conditions may be effected by tilting the trimmer while partially retracted, as shown in FIGS. 12 and 13. The full extension of the trimmer in a horizontal position is indicated in FIG. 14, and from this position a still further extension and upward tilting is possible, as in FIG. 15. In the latter instances, the hydraulic cylinder links 35 would be substantially fully retracted to their shortest position.

For simplicity the hydraulic cylinder links 35 are indicated only in straight black lines in FIGS. 10–15. However, obviously the relative elongation and shortening of these links 35, coupled with the swinging of the main triangular links 10, may make possible positioning of the trimmer conveyor in the wide variety of useful effective relationships to the delivery elbow B.

It will be seen that connecting the hydraulic cylinder links 35 to pivot points fixed respectively on the chute supporting structure and on the trimmer frame, provides for most effective application of the power which may be applied to these hydraulic cylinder links 35. It will be understood that these cylinders and the hydraulic cylinder 30 for actuating the main supporting links are capable of being moved to any part of their respective strokes, and by hydraulic control may be held firmly in any selected position. The same is true of the gate actuating hydraulic cylinder.

Figure 3:
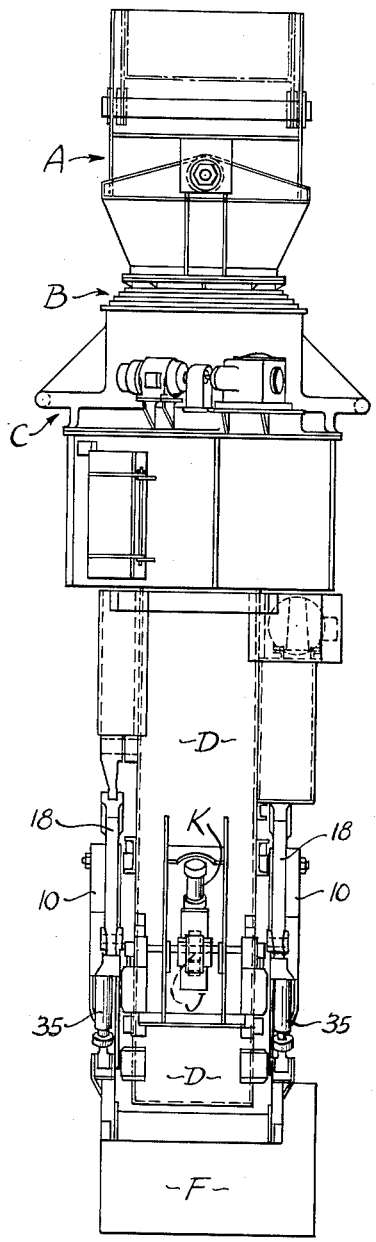
FIG. 3 is a rear elevation, that is, looking from right to left at the assemblage shown in FIG. 1.

It may be understood that the rotating supporting structure and the telescoping chute are illustrative of similar structures with which the trimmer conveyor support and operating means may be used. The rear view of FIG. 3 may be referred to for observation of the relative position of the links 10, 18, 35, and the gate operating pinion J and cylinder K. The relative position of the trimmer conveyor below the chute elbow is also clear in this rear view.

The particular trimmer conveyor here shown comprises details of design and attains efficiency in operation particularly suited to the objectives of the present application. Structural details of the trimmer conveyor and driving means are not herein claimed and need only brief reference to the parts shown in FIGS. 4 and 5.

Within the housing 7 is a motor 50 having a chain drive indicated at 52 with the shaft 53 of the rearmost belt roller. All of the rollers 5 are provided with guiding grooves 56 receiving ribs formed on the inner side of the conveyor belt 6. The forward roller at the delivery end of the trimmer conveyor has its shaft mounted for a sliding longitudinal adjustment for tightening the belt. As indicated, the shaft for this roller may be journaled in a slide 60 adjustable by a screw 62. For convenience in repair and replacement of the belt, one whole side frame member forwardly of the housing 7 may be made removable. These and other details of the structure of the particular trimmer conveyor may be presented in another application.

Figure 7:
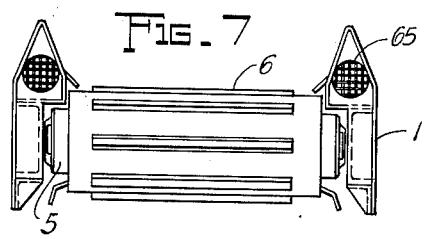
FIG. 7 is an elevation showing the discharge end of the trimmer conveyor.

In FIG. 7 are indicated screen protected openings 65 behind which may be positioned projector lamps 66. In FIGS. 8 and 9 appear protecting cover plates 70 sloping each way from the center over the lower reach of the conveyor belt. As indicated, these and other details are not intended to be claimed in the present application.

When in use, suitable controls for rotating the trimmer with relation to the telescope chute may be provided for operation by a single operator with suitable controls for operating the hydraulic cylinders for moving the trimmer conveyor to any of its operative positions, as well as to the vertical or stored position, indicated in FIGS. 1 and 10.

In operation it is understood that it is desirable to maintain the vertical chute portion substantially filled with a moving column of coal. In this connection the gate E may be opened varying amounts to discharge the coal in any desired volume consistent with the particular trimming operation being carried out.

Obviously, the construction of the main supporting and telescoping hydraulic cylinder linkages and the means for swinging the main supporting links may be mechanically varied without departing from the spirit and intent of the present invention which is defined in the appended claims.

I claim:

1. A trimmer adapted to control downward flow and lateral distribution of granular material within the hold of a vessel and adapted for use with a vertical telescoping chute, and comprising an elbow structure rotatably supported at the lower end of said chute and having a tubular upright portion and a lateral delivery opening, a rigid material conveyor comprising a rigid elongated frame and a material conveyor belt and means carried by the frame for driving the belt, means supporting said frame on the rotatable elbow support structure permitting longitudinal movement of the frame forwardly and rearwardly of the delivery opening and vertical positioning thereof adjacent to the upright portion of the chute and for changing the slope of the conveyor frame, said means including a pair of rigid main supporting links pivoted to the conveyor frame on a common axis intermediate the ends of the frame and pivoted on a common fixed axis to said rotatable structure, rigid elements pivotally connected to said main supporting links at points separated from the common axis and actuating means connected with said elements for swinging said links about the fixed axis, a pair of elongating hydraulic pistons and cylinders connected to said rotatable support and swingable on a common axis and pivotally connected to said frame at points rearwardly separated from said rigid link pivots, said hydraulic pistons and cylinders acting to swing the delivery means to change the delivery angle of the conveyor and to move the conveyor closely to the elbow portion when the conveyor is swung to a vertical position.

2. The structure defined in claim 1 which includes crank arms connected to said elements, and means for moving the crank arms including a rack and pinion, and means for actuating the rack and pinion including a hydraulic cylinder having its plunger connected to said rack.

3. The structure defined in claim 1 in which the means for actuating said elements includes a pair of toothed racks and a pair of pinions, a common shaft on which they are mounted, a pair of crank arms, and a hydraulic cylinder connected to both said racks for moving the racks and pinions simultaneously.

4. The structure defined in claim 1 in which said elbow is curved toward its delivery opening for discharging material tangentially upon the belt of the conveyor, a gate for closing said opening and means for moving the gate to various positions.

5. A trimmer of the character described comprising a conveyor, a rotatably supported member having an upright chute portion and a curved elbow having an opening for delivery material substantially tangentially onto the conveyor, an elongated straight delivery conveyor frame, a plurality of supporting links pivotally attached to the chute and to the conveyor at longitudinally separated points and at both sides of the conveyor, means for swinging the link arms to move the conveyor from a laterally extending position to a vertical position alongside of the chute and elbow, the length of said conveyor being several times that of the transverse dimension of the upright chute, and each of one pair of links comprising a hydraulic cylinder and piston and attached at one end to the conveyor frame and at its other end to the rotatably supported member and each being extensible and contractible to change the distance between its pivots.

6. A trimmer for boat loading apparatus adapted to control downward flow of granular material and to distribute the material within the hold of a vessel, and comprising a rotatably supported elbow structure having a tubular upright portion adapted for attachment to a vertical chute and having a laterally directed delivery opening, said trimmer including a material conveyor and delivery member adapted to extend forwardly from said delivery opening and adapted to be swung to vary the angle of discharge and to be moved out of operating position to a vertical position closely adjacent to said tubular upright portion, said conveyor comprising a rigid elongated frame and a material conveyor belt, means carried by and positioned at the rearward portion of the frame for driving the belt, a pair of main rigid supporting members each pivotally connected to the elbow structure at a common fixed axis and pivotally connected on a common axis to the mid portion of the conveyor frame, means mounted on the elbow structure and connected to the main rigid support for swinging said supporting members about the fixed axis to move the pivotal connections at the frame from a position substantially forwardly at the delivery opening to a position rearwardly of the elbow, a pair of hydraulic cylinder link members pivotally connected to the elbow structure at the common axis of the main supporting rigid links and connected on a common axis at their other ends to said frame at a substantial distance rearwardly of the connections of the main supporting links to the frame, and means connected to the main supporting rigid link members at a distance from the common axis at the elbow structure for effecting swinging movement of the main supporting links.

7. A trimmer of the character described comprising a conveyor, a rotatably supported member having an upright chute portion and a curved elbow having an opening for delivering material substantially tangentially onto the conveyor, an elongated straight delivery conveyor frame, a pair of main supporting links pivoted to the conveyor frame and to the rotatably supported member on a common fixed axis, means connected to the main supporting links at points a distance from said common axis and means connected with the latter means for swinging the main supporting elements, a pair of extensible links each including an elongated hydraulic cylinder and piston and each connected at one end to said rotatably supported member and at the other end to said frame on a common axis longitudinally separated along the frame from the pivots at the frame of said main supporting links, the changing length of the hydraulic cylinder links relative to the fixed length of the main supports being adapted to change the angular position of the conveyor frame with relation to the upright chute portion.

8. A trimmer of the character described comprising a conveyor, a rotatably supported member having an upright chute portion and a curved elbow having an opening for delivering material laterally and substantially tangentially onto the conveyor, an elongated straight delivery conveyor frame adapted to extend forwardly from said opening and adapted to be swung to a vertical position parallel with the upright chute portion, a pair of rigid main supporting links pivoted on a common axis substantially midway of the ends of the conveyor frame and pivoted at their other ends on a common fixed axis to the rotatably supported member, actuating means pivotally connected to each of said main rigid links at a point removed from the fixed axis and acting to swing the main supporting links through an arc extending from a position forwardly of the delivery opening to a position at one side of and adjacent to the upright chute portion, a pair of hydraulic piston and cylinder connecting links each pivoted at one end to the rotatable support and at the other end to the conveyor frame rearwardly of the pivots for the main supporting links and adapted to change the angle of the frame with relation to the main supporting links and to move the rear portion of the frame toward and away from the elbow.

References Cited in the file of this patent

UNITED STATES PATENTS

| | | |
|---|---|---|
| 1,441,659 | Case | Jan. 9, 1923 |
| 2,857,041 | Preston | Oct. 21, 1958 |